(12) United States Patent  
Takanami (10) Patent No.: US 7,665,497 B2
(45) Date of Patent: Feb. 23, 2010

(54) RADIAL TIRE FOR AIRPLANE WITH ZIGZAG ENDLESS BELT AND METHOD OF MANUFACTURING RADIAL TIRE FOR AIRPLANE WITH ZIGZAG ENDLESS BELT

(75) Inventor: Takeshi Takanami, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 652 days.

(21) Appl. No.: 11/406,356

(22) Filed: Apr. 19, 2006

(65) Prior Publication Data

US 2006/0237114 A1    Oct. 26, 2006

(30) Foreign Application Priority Data

Apr. 21, 2005  (JP) ............................. 2005-123839
Mar. 28, 2006  (JP) ............................. 2006-088357

(51) Int. Cl.
*B60C 9/18*   (2006.01)
*B60C 9/20*   (2006.01)
*B60C 9/22*   (2006.01)

(52) U.S. Cl. ..................................... 152/533; 156/117
(58) Field of Classification Search ................. 152/533; 156/117
See application file for complete search history.

(56) References Cited

U.S. PATENT DOCUMENTS 5,513,685 A      5/1996   Watanabe et al.
2005/0056359 A1  3/2005   Ueyoko et al.

FOREIGN PATENT DOCUMENTS

EP          1477333 A    11/2004
WO      WO 03/061991 A1   7/2003

*Primary Examiner*—Adrienne C Johnstone
(74) *Attorney, Agent, or Firm*—Sughrue Mion, PLLC (57) ABSTRACT

In a belt layer structured by a plurality of zigzag endless belts which are layered in a tire radial direction and are folded-over at both ends in a tire widthwise direction and are disposed uniformly over an entire region, an angle θ1 of an inner side cord portion and a tire equatorial plane, an angle θ2 of an outer side cord portion and the tire equatorial plane, and an angle θM of an intermediate cord portion and the tire equatorial plane, are θ1>θM>θ2.

5 Claims, 7 Drawing Sheets

RADIAL TIRE FOR AIRPLANE WITH ZIGZAG ENDLESS BELT AND METHOD OF MANUFACTURING RADIAL TIRE FOR AIRPLANE WITH ZIGZAG ENDLESS BELT

CROSS-REFERENCE TO RELATED APPLICATION

This application claims priority under 35 USC 119 from Japanese Patent Application Nos. 2005-123839, and 2006-088357, the disclosure of which is incorporated by reference herein.

BACKGROUND OF THE INVENTION

1. Field of the Invention

The present invention relates to a radial tire for an airplane which is used in airplanes such as passenger jet planes or the like, and to a method of manufacturing the radial tire for an airplane.

2. Description of the Related Art

Figure 7A:
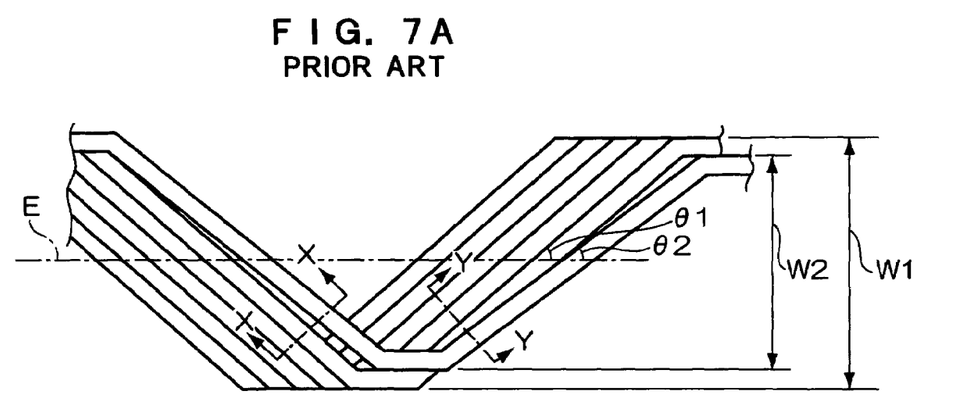
FIG. 7A is an expanded view showing a conventional zigzag endless belt during molding.
Figure 7B:
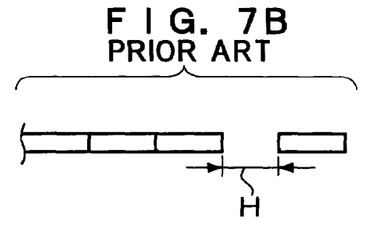
FIG. 7B is a cross-sectional view taken along X-X of FIG. 7A.
Figure 7C:
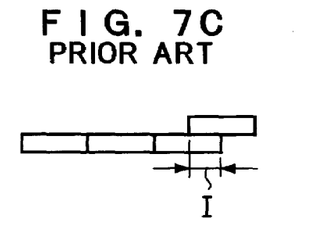
FIG. 7C is a cross-sectional view taken along Y-Y of FIG. 7A.

Conventionally, structures such as disclosed in WO 2003/061991 have been known as a radial tire for an airplane. As shown in FIG. 7, the radial tire for an airplane disclosed in WO 2003/061991 has an endless zigzag belt ply in which cords, which extend in the circumferential direction while zigzagging by being folded over at both ends of the ply, are embedded substantially uniformly at the entire region.

In a radial tire having such an endless zigzag belt ply, the cut ends of the cords are not exposed at the both ends of the belt. Therefore, even in cases in which the angle of inclination of the cords with respect to the tire equatorial plane is made to be small in an attempt to improve the total strength of the belt, the shearing strain between layers at the ends of the belt is low, and it is difficult for belt end separation to arise. As a result, the belt layer can be made to be lighter-weight by reducing the total number of belt plies while maintaining the prescribed safety rate. Further, this lightening of the weight of the belt layer can suppress the occurrence of a standing wave during high-speed traveling such as immediately before take-off on a runway. Therefore, tires having the above-described endless zigzag belt ply are extremely well suited to be tires for airplanes.

In the endless zigzag belt ply having the above-described structure, in cases such as when a belt width W changes among plural layers or the like, the need arises to make the angle of bending of the cords at the ply end be different from those of the adjacent cords. Accordingly, as shown in FIG. 7, when the belt width changes from W1 to W2, the angle of intersecting a tire equatorial plane E also varies from θ1 to θ2. Between adjacent cords before and behind the change, a gap H arises, overlapping I arises, the rubber between the cords within the belt after vulcanization cannot be sufficiently ensured, and strain increases.

Further, in a tire in which the above-described endless zigzag belt ply and a spiral belt ply, in which inextensible, high elastic modulus cords are wound spirally in the tire circumferential direction, are layered, there is little change in the cord angles of the endless zigzag belt ply within the mold at the time of vulcanization. Therefore, after vulcanization as well, the aforementioned gap H and overlapping I remain, and this is a cause of an increase in strain. Such strain is an impediment to improving the durability of the pneumatic radial tire for an airplane.

SUMMARY OF THE INVENTION

In view of the aforementioned, the present invention provide a radial tire for an airplane in which there is little strain of the belt layers and which has high durability, and a method of manufacturing the radial tire for an airplane.

A radial tire for an airplane of a first aspect has: a carcass layer which is toroidal, and in which are embedded a plurality of cords which intersect a tire equatorial plane; a tread rubber layer disposed at a tire radial direction outer side of the carcass layer; and a belt layer disposed between the carcass layer and the tread rubber layer, wherein the belt layer has a zigzag endless belt which forms a plurality of layers in a tire radial direction and in which cords, which intersect the tire equatorial plane and which extend in a tire circumferential direction, are bent at both ends in a tire widthwise direction and are disposed substantially uniformly over an entire region, and an inner side cord portion, which structures an inner side belt layer within the belt layer, intersects the tire equatorial plane at a first angle, and an outer side cord portion, which structures an outer side belt layer which is disposed at a tire radial direction outer side of the inner side belt layer, intersects the tire equatorial plane at a second angle which is different than the first angle, and an intermediate cord portion, which is disposed between the inner side cord portion and the outer side cord portion, intersects the tire equatorial plane at an intermediate angle which is between the first angle and the second angle.

The radial tire for an airplane of the first aspect of the present invention has a zigzag endless belt in which cords, which intersect the tire equatorial plane and which extend in a tire circumferential direction, are bent at both ends in a tire widthwise direction and are disposed uniformly over the entire region. Usually, the cords intersect the tire equatorial plane at an angle of 5° to 15°. In the present invention, among these cords, the inner side cord portion, which structures an inner side belt layer disposed at the side near the tire radial direction inner side, intersects the tire equatorial plane at the first angle, and the outer side cord portion, which structures the outer side belt layer at the outer side of the inner side belt layer, intersects the tire equatorial plane at the second angle which is different than the first angle. The intermediate cord portion, which is disposed between the inner side cord portion and the outer side cord portion, intersects the tire equatorial plane at an intermediate angle which is between the first angle and the second angle. Namely, given that the first angle is θ1, the second angle is θ2, and the intermediate angle is θM, the relationship θ1<θM<θ2, or θ2<θM<θ1, is established.

By providing the intermediate cord portion in this way, the gap and the overlapping between cords in a vicinity of the switching of the angle can be made to be small. In this way, the rubber between the cords within the belt after vulcanization can be ensured, strain can be made small, and durability can be improved.

In a radial tire for an airplane of a second aspect of the present invention, the inner side belt layer and the outer side belt layer are structured so as to have different widths, and a belt width structured by the intermediate cord portion is an intermediate width between a width of the inner side belt layer and a width of the outer side belt layer.

By making the belt width of the intermediate cord layer be an intermediate width between the width of the inner side belt layer and the width of the outer side belt layer, the gap and the overlapping between cords in a vicinity of the switching of the angle can even more reliably be made to be small.

In a radial tire for an airplane of a third aspect of the present invention, the intermediate cord portion is wound in the tire circumferential direction over greater than or equal to one circumference and less than or equal to ten circumferences.

In order to make the gap and the overlapping between adjacent cords small, the intermediate cord portion is preferably wound over one circumference or more, and, from the standpoint of the balance between improving durability and decreasing weight, the intermediate cord portion is preferably wound over less than or equal to 10 circumferences.

In a radial tire for an airplane of a fourth aspect of the present invention, the belt layer further has a spiral belt which is structured by inextensible, high elastic modulus cords extending in the tire circumferential direction and being wound spirally in a direction toward a tire axial direction.

Here, "inextensible" means elongation at the time of rupture being less than 10%, and "high elastic modulus" means having a tensile rupture strength of greater than or equal to 6.3 cN/dtex. By providing a spiral belt structured by inextensible, high elastic modulus cords in this way, it is possible to structure a tire for an airplane which has good durability.

A method of manufacturing a radial tire for an airplane of a fifth aspect of the present invention is a method of manufacturing the radial tire for an airplane of any of the first through third aspects, wherein an expansion ratio of the belt layer within a mold at a time of vulcanization molding using a bladder is less than or equal to 1.5%.

By making the changes in the members at the time of vulcanization molding be small in this way, the rubber gauge between the plural belt layers which are laminated can be ensured.

Because the radial tire for an airplane of the present invention has the above-described structure, the present invention can provide a radial tire for an airplane in which there is little strain and which has high durability.

DETAILED DESCRIPTION OF THE INVENTION

A radial tire for an airplane relating to an embodiment of the present invention will be described in detail with reference to the drawings.

Figure 1:
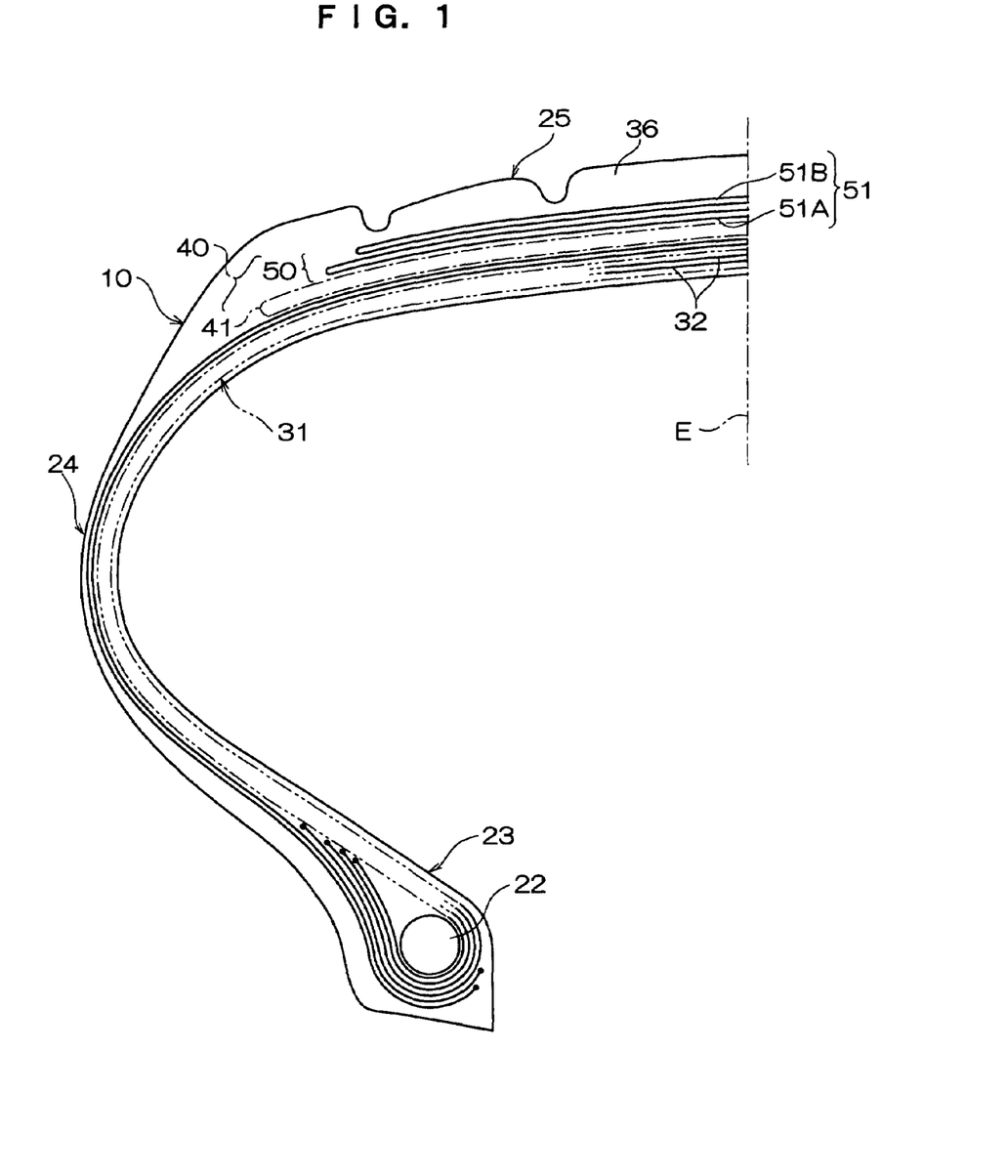
FIG. 1 is a meridian cross-sectional view of a radial tire for an airplane relating to an embodiment.

As shown in FIG. 1, a radial tire 10 for an airplane of the present embodiment has a pair of bead portions 23 in each of which a bead core 22 is embedded, sidewall portions 24 extending substantially toward the radial direction outer side from the bead portions 23 respectively, and a substantially cylindrical-tubular tread portion 25 joining the radial direction outer ends of the sidewall portions 24.

The radial tire 10 for an airplane is reinforced by a toroidal carcass layer 31 which extends from one of the bead portions 23 to the other bead portion. The carcass layer 31 is structured from one or more (six in the present embodiment) carcass plies 32 being superposed one on the other. The both widthwise direction end portions of the four layers at the inner layer side among these carcass plies 32 are turn-up plies which are folded-over around the bead cores 22 from the axial direction inner sides toward the axial direction outer sides. Further, the two layers at the outer layer side are down plies which extend to the bead cores 22 along the outer sides of the folded-over portions of the carcass plies 32 of the inner layer side.

Figure 2:
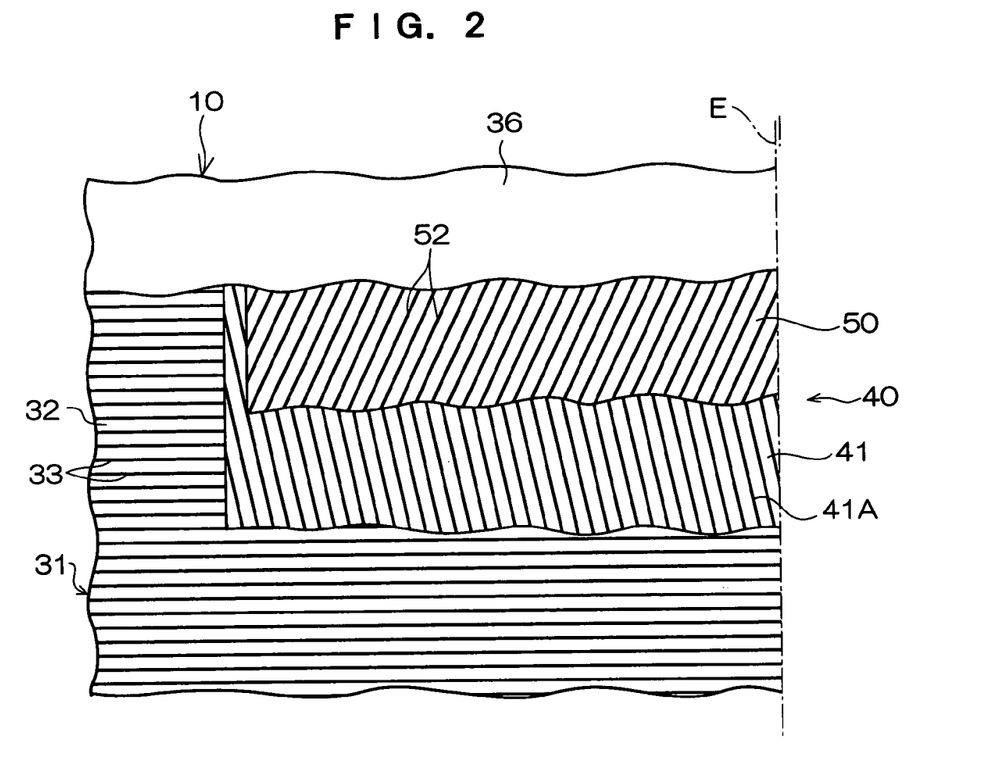
FIG. 2 is a partially-broken plan view of the radial tire for an airplane shown in Fig. 1.

As shown in FIG. 2, cords 33, which are formed from a large number of nylon, e.g., 66 nylon, strands which are substantially orthogonal to a tire equatorial plane E (extend in the radial direction), are embedded within each of the carcass plies 32. A tread rubber 36 is disposed at the radial direction outer side of the carcass layer 31.

A belt layer 40 is disposed between the carcass layer 31 and the tread rubber 36. The belt layer 40 is structured by a spiral belt 41 which is positioned at the side near to the carcass layer 31, and a zigzag endless belt 50 which is positioned at the side near to the tread rubber 36.

Figure 3:
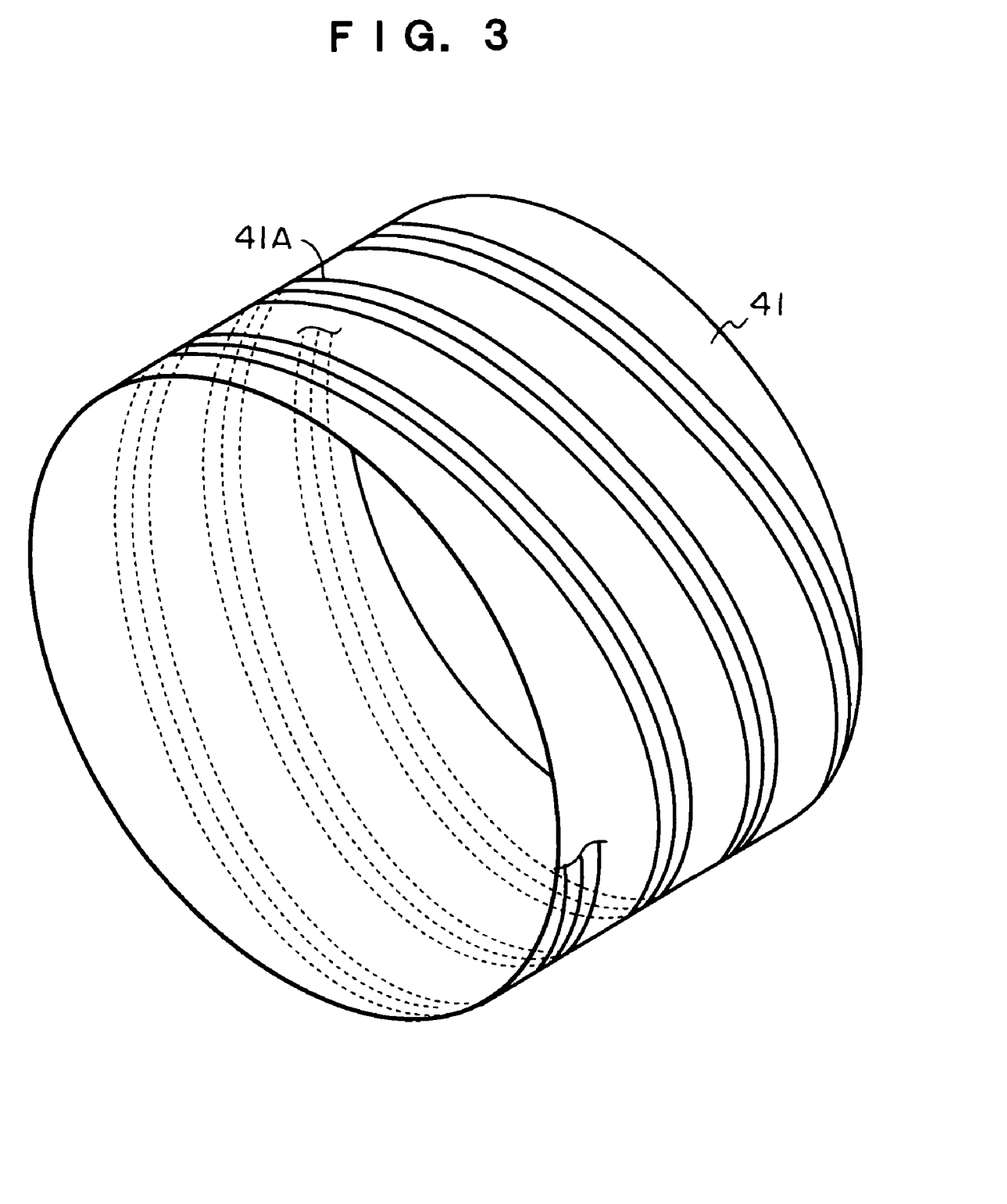
FIG. 3 is a perspective view showing a spiral belt during molding.

As shown in FIG. 3, the spiral belt 41 is structured by cords 41A being wound spirally in a direction toward the tire axial direction, while being inclined slightly from the tire circumferential direction. The cords 41A are wound doubly, such that the spiral belt 41 is two layers. An inextensible, high elastic modulus material such as, for example, steel, aramid fibers, or the like, is used as the cords 41A.

Figure 4:
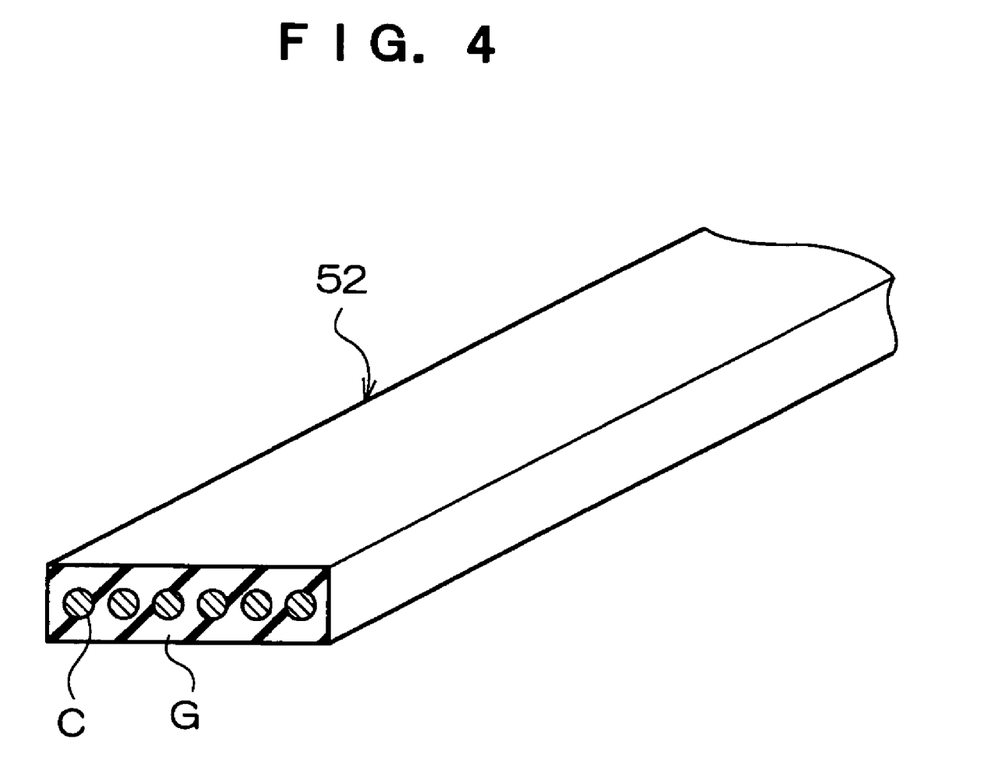
FIG. 4 is a perspective view showing a portion of a long-and-narrow body relating to the embodiment.
Figure 5:
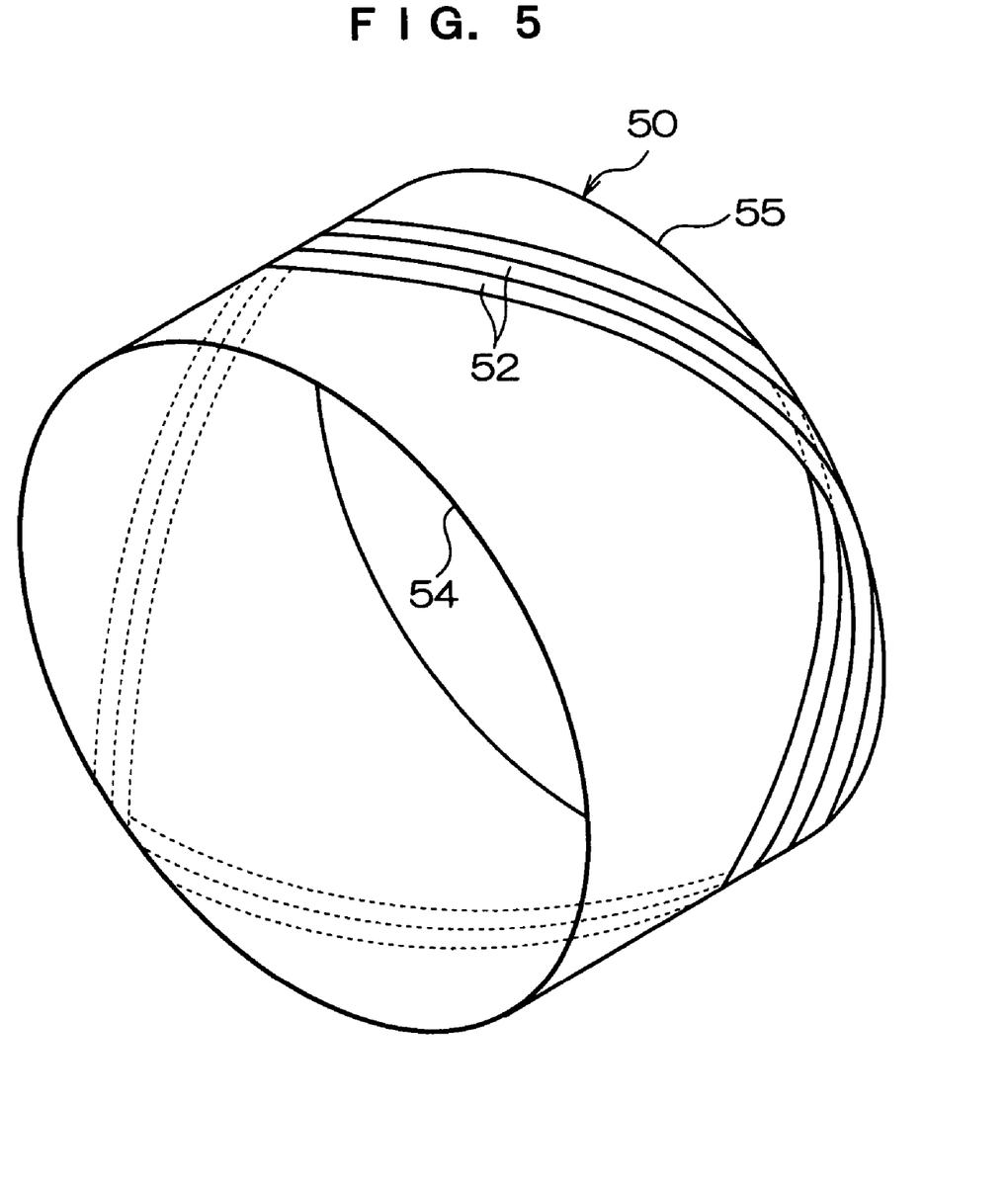
FIG. 5 is a perspective view showing an zigzag endless belt relating to the embodiment during molding.
Figure 6A:
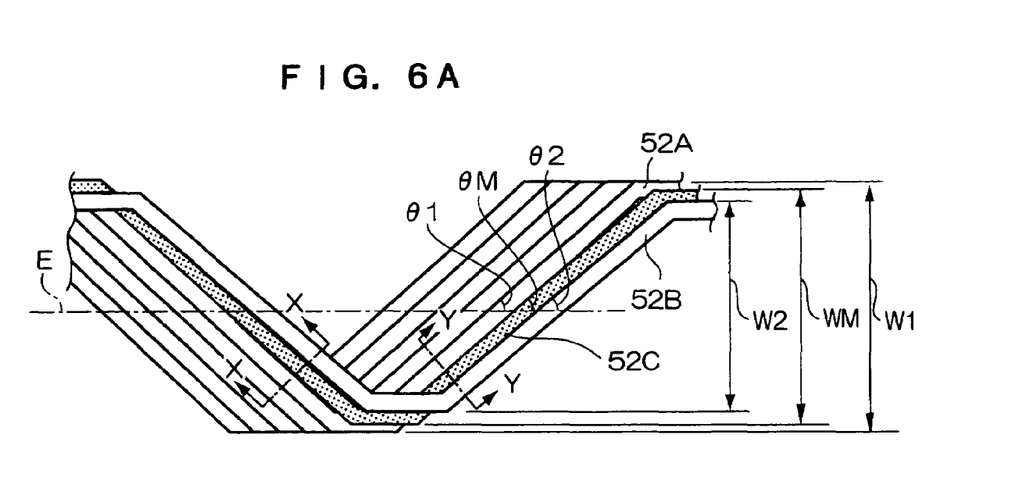
FIG. 6A is an expanded view showing the zigzag endless belt relating to the embodiment during molding.
Figure 6B:
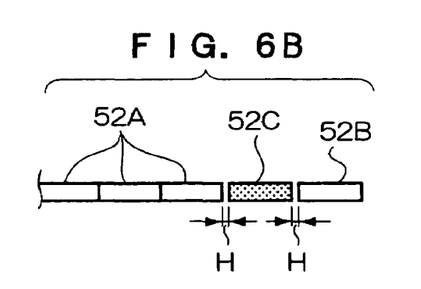
FIG. 6B is a cross-sectional view taken along X-X of FIG. 6A.
Figure 6C:
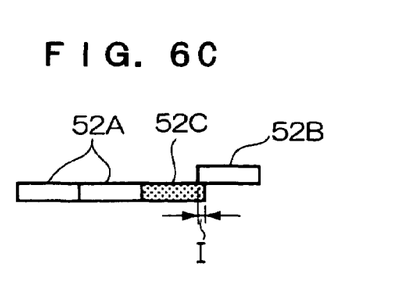
FIG. 6C is a cross-sectional view taken along Y-Y of FIG. 6A.

As shown in FIG. 4, the zigzag endless belt 50 is formed by preparing a ribbon-shaped long-and-narrow body 52 structured such that one or more, and usually one or plural, cords C (six in the present embodiment) are covered by rubber G, and, as shown in FIGS. 5 and 6, winding the long-and-narrow body 52 in the circumferential direction while going back-and-forth one time between ply ends 54, 55 substantially each one circumference, and carrying out this type of winding plural times while shifting the long-and-narrow body 52 in the circumferential direction by substantially the width of the long-and-narrow body 52 such that gaps do not arise between the wound sections of the long-and-narrow body 52. As a result, by changing the folding-over direction at the both ends 54, 55 within the zigzag endless belt 50, the long-and-narrow body 52, which extends substantially in the circumferential direction while zigzagging, is embedded substantially uniformly in the entire region of the zigzag endless belt 50.

When the zigzag endless belt 50 is formed by the above-described method, the long-and-narrow body 52 is doubled. Therefore, two layers of the zigzag endless belt plies 51 are formed at one time due to sections of the long-and-narrow body 52 intersecting one another between the layers.

The long-and-narrow body 52 is structured by a first cord portion 52A positioned at the inner side of the tire radial direction, a second cord portion 52B positioned at the tread rubber 36 side, and an intermediate cord portion 52C positioned between the first cord portion 52A and the second cord portion 52B.

The first cord portion 52A structures two layers of zigzag endless belt plies 51A at the tire radial direction inner side.

The ply width of the zigzag endless belt plies 51A is width W1. The first cord portion 52A intersects the tire equatorial plane E at angle θ1.

The second cord portion 52A structures two layers of zigzag endless belt plies 51B at the tire radial direction outer side. The ply width of the zigzag endless belt plies 51B is width W2, which is more narrow than ply width W1. The second cord portion 52B intersects the tire equatorial plane E at angle θ2 which is smaller than angle θ1.

The intermediate cord portion 52C is disposed in a vicinity of the switching of the layers of the zigzag endless belt plies 51A, 51B, and is wound over at least one circumference. The ply width of the portion structured by the intermediate cord portion 52C is intermediate width WM, and the intermediate cord portion 52C intersects the tire equatorial plane E at angle θM. The angle θM is such that θ1>θM>θ2, and the intermediate width WM is such that W1>WM>W2.

In order to make the gap and the overlapping between the adjacent first cord portion 52A and second cord portion 52B small, it is preferable that the intermediate cord portion 52C is wound over one circumference or more. From the standpoint of the balance between improving the durability of and decreasing the weight of the radial tire 10 for an airplane, it is preferable that the intermediate cord portion 52C is wound over less than or equal to ten circumferences.

The expansion ratio of the belt layer 40 within a mold at the time of vulcanization molding is preferably less than or equal to 1.5%. This is in order to make the changes in the members at the time of vulcanization molding be small, and in order to ensure the rubber gauge between the plural layers which are laminated.

At the position where the ply width W of the zigzag endless belt ply 51 switches, the angle of intersection θ between the long-and-narrow body 52 and the tire equatorial plane E also switches. Therefore, when the angle of intersection switches directly from θ1 to θ2, as shown in FIG. 7, the gap H will form and the overlapping I will arise between the adjacent cords before and behind the switching.

In the present embodiment, because the intermediate cord portion 52C is disposed in a vicinity of the switching of the layers of the zigzag endless belt plies 51A and 51B, the gap H and the overlapping I can be made to be small. As a result, the rubber between the cords within the belt layer 40 after vulcanization can be ensured, strain can be kept small, and durability can be improved.

There are various sizes of tires for airplanes such as, for example, 30×8.8R15, 46×17.0R20, 50×20.0R22, and the like. However, if the long-and-narrow body 52 is made to go back-and-forth one time between the both ends 54, 55 of the zigzag endless belt ply 51 substantially each one circumference as described above, the cords intersect the tire equatorial plane E within a range of angles A of from 5° to 15° in any tire.

EXAMPLES

Two types of test tires relating to the present invention (Examples 1, 2) and one type of test tire relating to a comparative example (Comparative Example 1) were readied, and evaluation of durability was carried out in accordance with an internal drum test. The intermediate cord portion 52C was wound-around twice in the tire of Example 1, the intermediate cord portion 52C was wound-around five times in the tire of Example 2, and the intermediate cord portion 52C was not provided in the tire of Comparative Example 1. Note that, for all of the tires, tires were used which has six layers of spiral belts, four layers of zigzag endless belts, and a tire size of 1270×455R22 30PR.

TABLE 1

|  | Example 1 | Example 2 | Comparative Example 1 |
| --- | --- | --- | --- |
| spiral belts | 6 layers | 6 layers | 6 layers |
| zigzag endless belts | 4 layers | 4 layers | 4 layers |
| intermediate cord portion | 2 times | 5 times | none |
| running distance | 1.54 | 1.67 | 1.0 |

[Test Conditions]
testing internal pressure: 90% of normal internal pressure (1510 kPa)
testing load: 95% of normal load (232, 650 N)
testing speed: 40 MPH
running time: 4 minutes
test interval: 60 minutes Testing was carried out under the above test conditions, and comparison of the durabilities at the running distances until there was trouble with the belt layers was carried out. The value of the running distance of Comparative Example 1 was made to be 1.0, and the higher the value, the longer the running distance until the trouble and the better the durability. It is clear from Table 1 that both Examples 1 and 2 have superior durability as compared with Comparative Example 1.

What is claimed is:

1. A radial tire for an airplane, comprising:
    a carcass layer which is toroidal, and in which are embedded a plurality of cords which intersect a tire equatorial plane;
    a tread rubber layer disposed at a tire radial direction outer side of the carcass layer; and
    a belt layer disposed between the carcass layer and the tread rubber layer,
    wherein the belt layer has a zigzag endless belt which forms a plurality of layers in a tire radial direction and in which cords, which intersect the tire equatorial plane and which extend in a tire circumferential direction, are bent at both ends in a tire widthwise direction and are disposed substantially uniformly over an entire region, and
    an inner side cord portion, which structures an inner side belt layer within the belt layer, intersects the tire equatorial plane at a first angle, and an outer side cord portion, which structures an outer side belt layer which is disposed at a tire radial direction outer side of the inner side belt layer, intersects the tire equatorial plane at a second angle which is different than the first angle, and an intermediate cord portion, which is disposed between the inner side cord portion and the outer side cord portion, intersects the tire equatorial plane at an intermediate angle which is between the first angle and the second angle.

2. The radial tire for an airplane of claim 1, wherein
    the inner side belt layer and the outer side belt layer are structured so as to have different widths, and
    a belt width structured by the intermediate cord portion is an intermediate width between a width of the inner side belt layer and a width of the outer side belt layer.

3. The radial tire for an airplane of claim 1, wherein the intermediate cord portion is wound in the tire circumferential direction over greater than or equal to one circumference and less than or equal to ten circumferences.

4. The radial tire for an airplane of claim 1, wherein the belt layer further has a spiral belt which is structured by inextensible, high elastic modulus cords extending in the tire circumferential direction and being wound spirally in a direction toward a tire axial direction.

5. A method of manufacturing a radial tire for an airplane according to claim 1, said method comprising:

vulcanization molding the belt layer of the tire using a bladder, wherein an expansion ratio of the belt layer within the mold is less than or equal to 1.5%.

* * * * *